US012689519B2

(12) United States Patent
    Fettes et al.

(10) Patent No.: US 12,689,519 B2
(45) Date of Patent: Jul. 21, 2026

(54) HASH CREATION USING ARBITRARY HEADER FIELD COMBINATIONS

(71) Applicant: Arista Networks, Inc., Santa Clara, CA (US)

(72) Inventors: Adrian Donald Fettes, Vancouver (CA); Stefan Rizwan Kheraj, Burnaby (CA)

(73) Assignee: Arista Networks, Inc., Santa Clara, CA (US)

( * ) Notice: Subject to any disclaimer, the term of this patent is extended or adjusted under 35 U.S.C. 154(b) by 103 days.

(21) Appl. No.: 18/617,490

(22) Filed: Mar. 26, 2024

(65) Prior Publication Data

US 2025/0310114 A1      Oct. 2, 2025

(51) Int. Cl.
    *H04L 9/32*              (2006.01)
(52) U.S. Cl.
    CPC .................................. *H04L 9/3236* (2013.01)
(58) Field of Classification Search
    CPC ..................................................... H04L 9/3236
    See application file for complete search history.

(56) References Cited

U.S. PATENT DOCUMENTS

| | | | |
|---|---|---|---|
| 11,900,024 B1* | 2/2024 | Volpe | H04L 49/3063 |
| 2008/0095368 A1* | 4/2008 | Iida | H04L 63/0442 |
| | | | 380/259 |
| 2016/0330027 A1* | 11/2016 | Ebrahimi | G06Q 20/4014 |
| 2018/0227130 A1* | 8/2018 | Ebrahimi | G06Q 20/065 |
| 2021/0029036 A1* | 1/2021 | Ghanwani | H04L 12/4641 |
| 2022/0150162 A1* | 5/2022 | Fujimoto | H04L 69/22 |

* cited by examiner

*Primary Examiner* — Sm A Rahman
(74) *Attorney, Agent, or Firm* — Patent Capital Group

(57) ABSTRACT

Particular embodiments described herein provide for a system, an apparatus, and a method for hash creation using arbitrary header field combinations. One example implementation can include operations associated with generating a first hash key from user-defined fields for a first packet, generating a second hash key from user-defined fields for a second packet. The first packet can be directed along a first direction in a network and the second packet can be directed along a second direction that is different from the first direction in the network. The first hash key and the second hash key can result in a same hash for the first and second packets, and the same hash is used to select an outgoing port channel member interface to be used in sending at least a portion of the first and the second packets in the network.

20 Claims, 10 Drawing Sheets

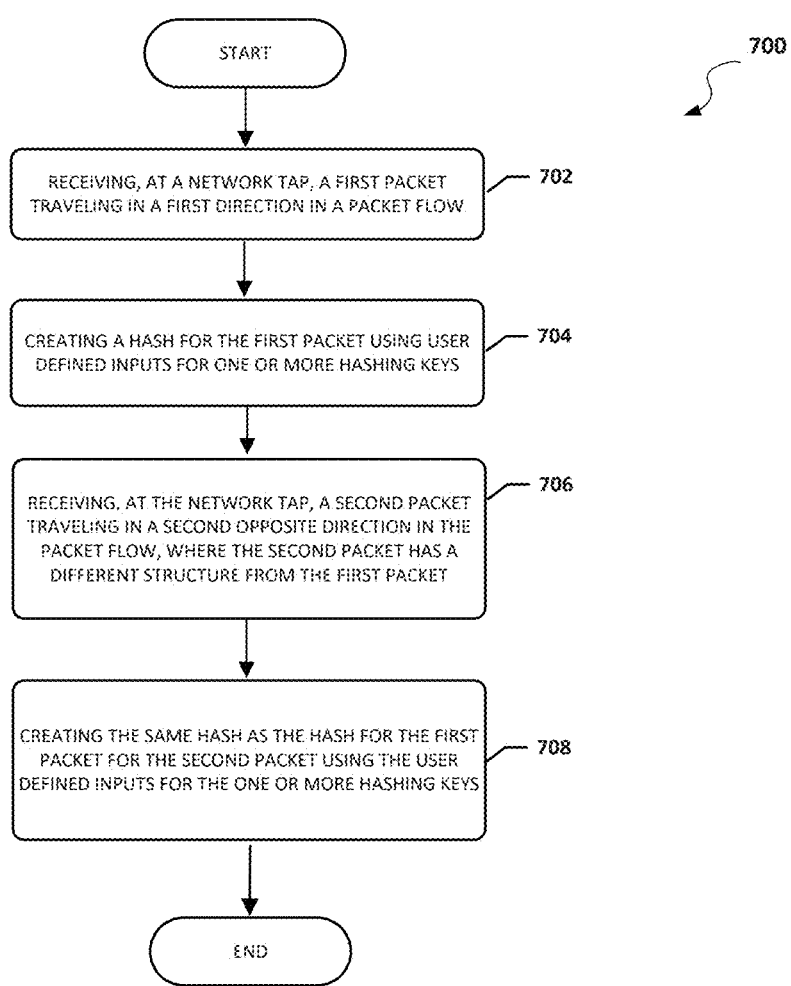

700

START

RECEIVING, AT A NETWORK TAP, A FIRST PACKET TRAVELING IN A FIRST DIRECTION IN A PACKET FLOW — 702

CREATING A HASH FOR THE FIRST PACKET USING USER DEFINED INPUTS FOR ONE OR MORE HASHING KEYS — 704

RECEIVING, AT THE NETWORK TAP, A SECOND PACKET TRAVELING IN A SECOND OPPOSITE DIRECTION IN THE PACKET FLOW, WHERE THE SECOND PACKET HAS A DIFFERENT STRUCTURE FROM THE FIRST PACKET — 706

CREATING THE SAME HASH AS THE HASH FOR THE FIRST PACKET FOR THE SECOND PACKET USING THE USER DEFINED INPUTS FOR THE ONE OR MORE HASHING KEYS — 708

END

FIGURE 7

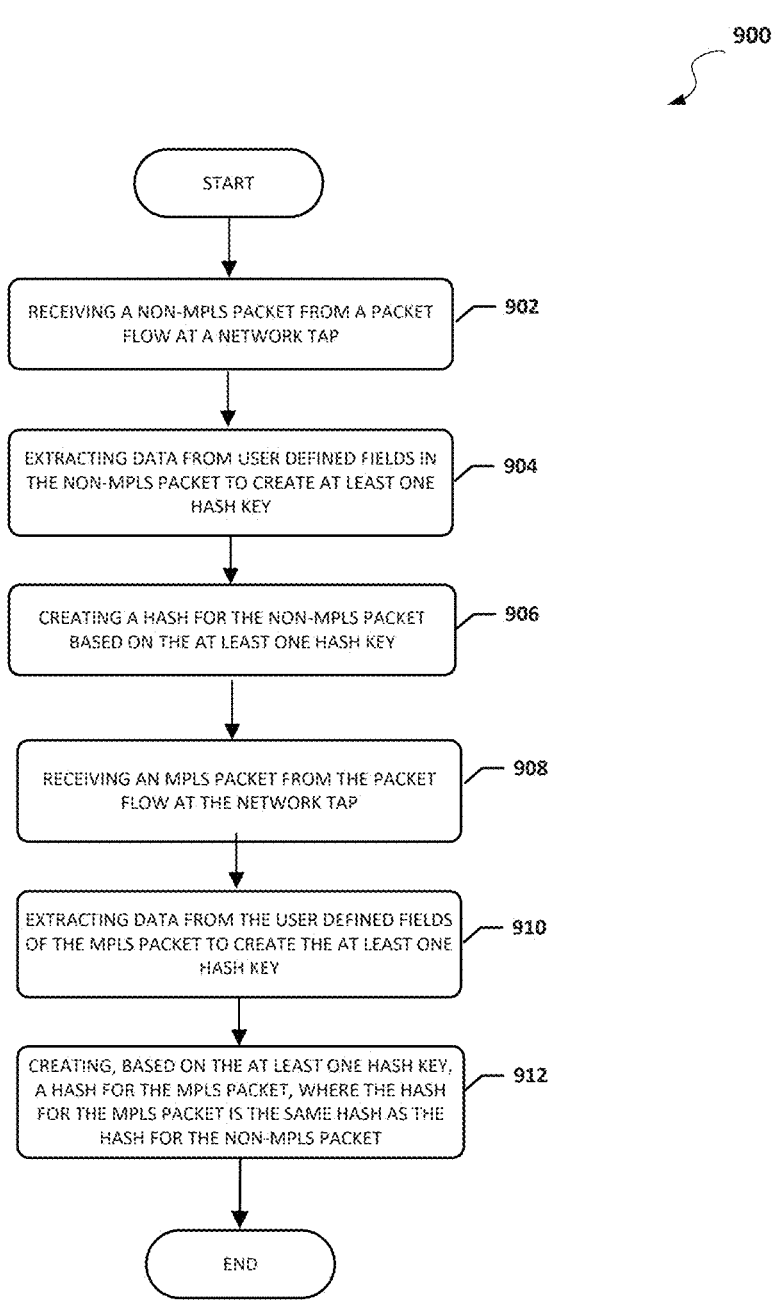

_900_

START

RECEIVING A NON-MPLS PACKET FROM A PACKET FLOW AT A NETWORK TAP — 902

EXTRACTING DATA FROM USER DEFINED FIELDS IN THE NON-MPLS PACKET TO CREATE AT LEAST ONE HASH KEY — 904

CREATING A HASH FOR THE NON-MPLS PACKET BASED ON THE AT LEAST ONE HASH KEY — 906

RECEIVING AN MPLS PACKET FROM THE PACKET FLOW AT THE NETWORK TAP — 908

EXTRACTING DATA FROM THE USER DEFINED FIELDS OF THE MPLS PACKET TO CREATE THE AT LEAST ONE HASH KEY — 910

CREATING, BASED ON THE AT LEAST ONE HASH KEY, A HASH FOR THE MPLS PACKET, WHERE THE HASH FOR THE MPLS PACKET IS THE SAME HASH AS THE HASH FOR THE NON-MPLS PACKET — 912

END

FIGURE 9

HASH CREATION USING ARBITRARY HEADER FIELD COMBINATIONS

TECHNICAL FIELD

This disclosure relates in general to the field of computing and/or networking and, more particularly, to a system, an apparatus, and a method for hash creation using arbitrary header field combinations.

BACKGROUND

A computer network is a set of computers sharing resources located on, or provided by, network nodes. Computers use common communication protocols over network connections to communicate with each other. Computer networks can support many applications and services, such as access to the World Wide Web, digital video and audio, shared use of application and storage servers, printers and fax machines, and use of email and instant messaging applications.

Most modern computer networks use protocols based on packet-mode transmission. A network packet is a formatted unit of data carried by a packet-switched network. Packets consist of two types of data, control information and user data (payload). The control information provides data the network needs to deliver the user data, for example, source and destination network addresses, error detection codes, and sequencing information. Typically, control information is found in packet headers and trailers, with payload data provided in between. Effectively routing and managing different types of packet flows presents a significant challenge for network operators and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified flowchart illustrating potential operations that may be associated with enabling hash creation using arbitrary header field combinations in accordance with an embodiment of the present disclosure;

FIG. 9 is a simplified flowchart illustrating potential operations that may be associated with creating a hash for non-encapsulated packets and encapsulated packets to enable hash creation using arbitrary header field combinations in accordance with an embodiment of the present disclosure.

Figure 1A:
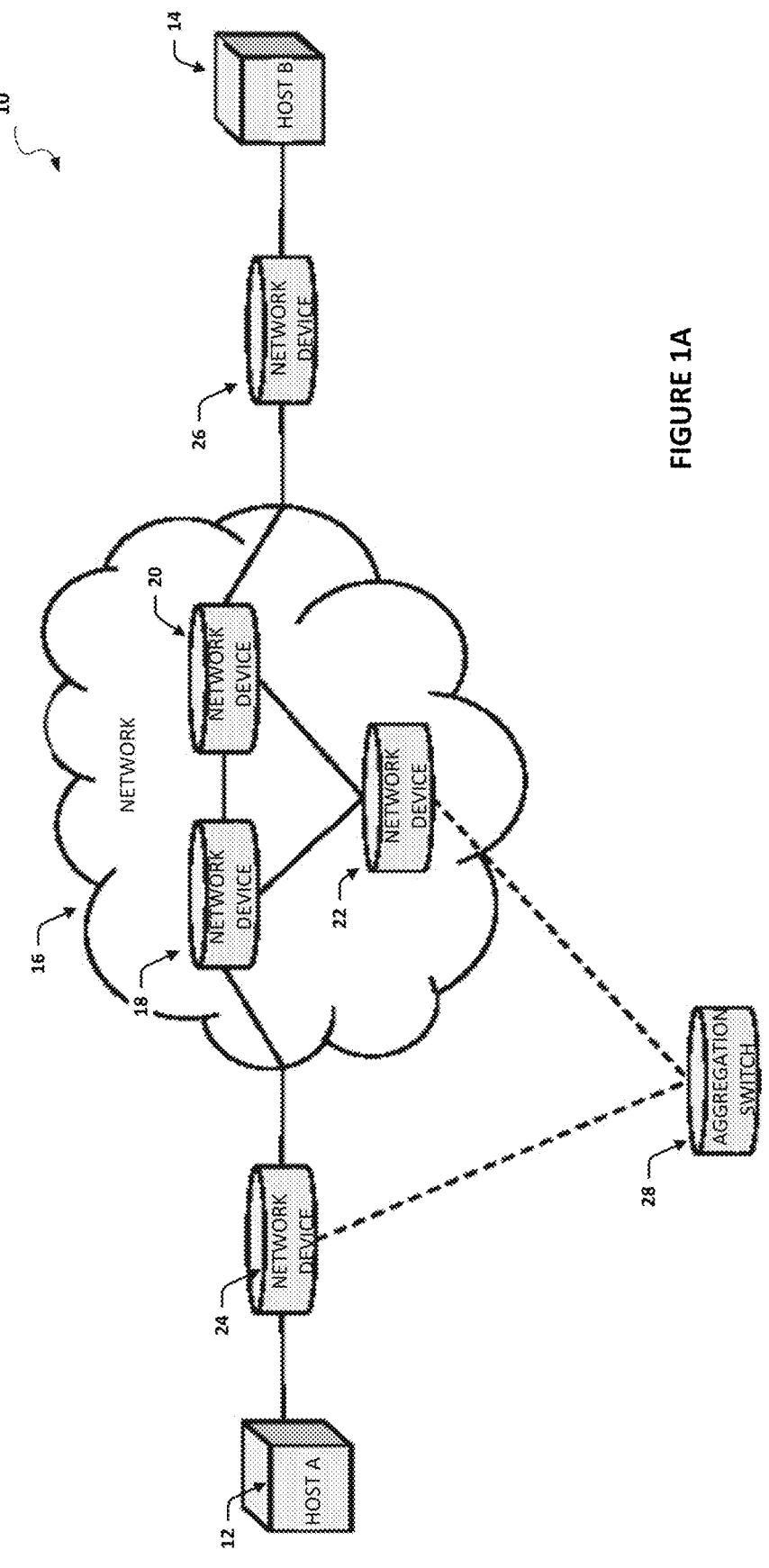
FIG. 1A is a simplified overview of a system for enabling hash creation for packet flows in a network environment, in accordance with an embodiment of the present disclosure.

The FIGURES of the drawings are not necessarily drawn to scale, as their dimensions can be varied without departing from the scope of the present disclosure.

DETAILED DESCRIPTION

The following detailed description sets forth examples of apparatuses, methods, and systems relating to using arbitrary header field combinations to enable packet load balancing at a network device and/or copy packets at a network tap device to send to a destination in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

In an example, a system and a method can help provide for hash creation using arbitrary header field combinations. For example, a system can be configured to use different arbitrary header field combinations to create a hash for packets such that packets in the same packet traffic flow would result in the same hash, even if the packets have a different packet structure (e.g., packets in a bidirectional traffic flow). The system and method can include a specific load balance profile that overwrites the default layer hashing behavior of a network tap in order to provide symmetrical hashing using common data within packets of a same packet traffic flow, whether the data is in the header or the payload of the packets. More specifically, a feature can be added in order to provide symmetrical hashing on internet protocol (IP) addresses for both multiprotocol label switching (MPLS) packets that include an MPLS header, and non-MPLS packets that include a non-MPLS header. Note that MPLS packets and non-MPLS packets are just example packets discussed herein, for purposes of teaching and discussion, and the architecture described below is not limited to only MPLS packets and non-MPLS packets. In addition, other fields in the packet may be used depending on design choice, system constraints, or network operator preferences. For example, transmission control protocol (TCP) source and destination ports, or other common header data within packets of a same packet traffic flow may be used for symmetrical hashing and/or traffic class, time-to-live (TTL), packet payload data, specifically set flag or flags, or some other data that are common to a specific group of packets that may or may not be part of the same traffic flow.

Hence, example embodiments of the present disclosure are not limited to addressing symmetrical hashing, albeit that may be a typical use case because IP addresses and TCP ports are the usual items targeted for hashing. However, the architecture discussed herein can readily apply to other fields in the packet that do not symmetrize (e.g., such as the traffic class). In that example, the architecture could hash packets with the same traffic class to the same load balance member.

Note also that as used herein, the term "symmetrical hashing" includes the broad concept that packets with the source and destination being swapped could have the same hash. This allows the combination of packet fields selected for the hash to be used such that the hash of packets in the same bidirectional packet traffic flow is the same, even if the packets have a different packet structure. In an example, to help enable symmetric hashing, an XOR combination of destination identifiers can be used because for packets communicated in a first direction (e.g., upstream), the packet traffic flow can have switched destination and source identifiers, as compared to packets traveling in an opposite second direction (e.g., downstream) in the packet traffic flow.

Typically, on most hardware designs, network load balance hashes are based on the packet header structure, as well as specific fields in the packet. Currently, when a hash for packets from the same packet traffic flow (but having different network header structures) is generated by a network tap, the packets can generate a different hash, even though they are from the same packet traffic flow. To overcome this issue, the system disclosed herein can ignore the packet header structure, and allow for the creation of a hash for each packet using arbitrary bits of the packet. Such bits can be from user-defined fields that are configurable per packet type. The system can also allow for packet load balancing using arbitrary header field combinations so that both MPLS packets and non-MPLS packets from the same packet traffic flow can generate the same hash and, therefore, can be sent to the same analyzer or monitoring appliance.

Example Systems, Apparatuses, and Methods

FIG. 1A is a simplified overview of a system 10 for enabling hash creation in a network environment for packets flowing between a source host and a destination host. Referring to FIG. 1A, the system 10 can include a source host 12 (labeled host A), a destination host 14 (labeled host B), a network 16, a plurality of network devices 18, 20, 22, 24, 26, and an aggregation switch 28. The aggregation switch 28 can be a tap aggregation switch (further detailed below) that has the ability to aggregate and to monitor traffic from multiple devices in the network 16. When monitoring a particular flow, the packet route between the hosts 12 and 14 may travel through various network tunnels and various network devices, such as network devices 18, 20, 22, 24, 26. If a network operator elects to tap traffic from multiple devices in the network 16, the network devices 18, 20, 22, 24, 26 can identify packets from the same flow, even when those packets have different network header stacks. For example, the packets may be encapsulated with headers from a variety of different networking protocols, some of which are detailed below.

Figure 1B:
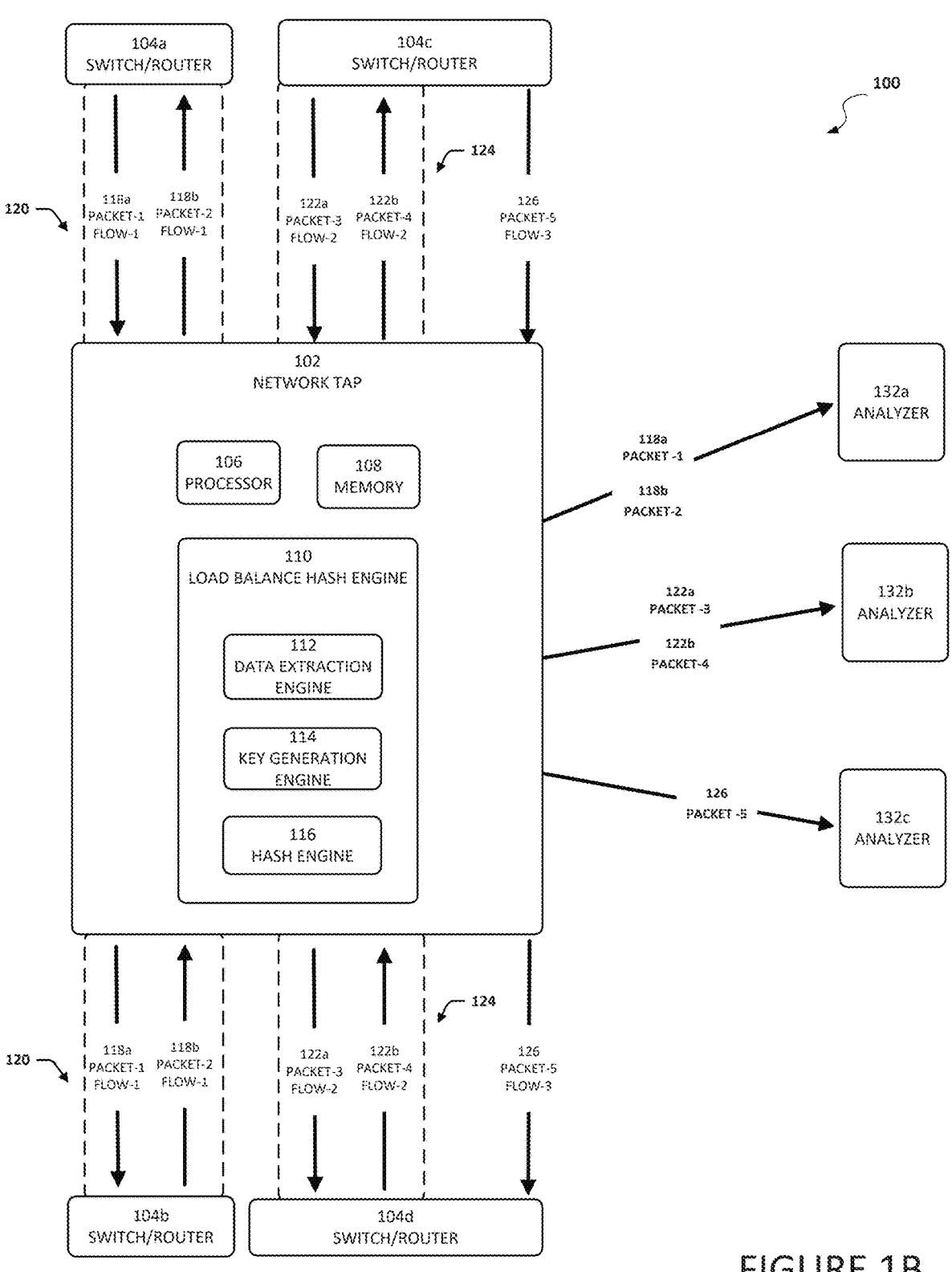
FIG. 1B is a simplified block diagram of a particular system for enabling hash creation using arbitrary header field combinations, in accordance with an embodiment of the present disclosure.

One challenge with existing systems that are designed for optimal traffic flow between hosts in a given network (such as that which is illustrated in FIG. 1B), is trying to aggregate specific packets from the same bidirectional flows to egress from the same port-channel member links, irrespective of the presence of tunnel encapsulation headers in the packets. Conventional packet hashing approaches cannot resolve this mismatch because the packet header structure itself is commonly used as the actual input for the hash functions in selecting a port-channel member link. By contrast, system 10 allows for ignoring the packet header structure, and for hashing on any arbitrary bits of the packet. This would include user-defined fields that are configurable per packet type, which allows for a successful aggregation of packets from the same bidirectional flow out the same port-channel member link.

Referring now to FIG. 1B, FIG. 1B is a simplified block diagram of a particular non-limiting implementation of a system 100 for enabling hash creation using arbitrary header field combinations. The system 100 can include a network tap 102 and two or more switches/routers 104a-104d. The network tap 102 can include one or more processors 106, memory 108, and a load balance hash engine 110. The load balance hash engine 110 can include a packet data extraction engine 112, a key generation engine 114, and a packet hash engine 116. The network tap 102 itself could be a switch, a router, a gateway, a hub, a server, a firewall, a load balancer, or any proprietary network device capable of performing the operations discussed herein. The broad term 'network device' is defined to encompass any such devices that are capable of performing some, or all, of the functions detailed herein as they pertain to the network tap 102. Similarly, switches/routers 104a-104d could readily be substituted with any suitable network element such as a gateway, a hub, a load balancer, or a proprietary device capable of performing the operations discussed herein.

In an illustrative example, packets in a packet traffic flow between two or more switches, routers, and/or hubs can be intercepted by the network tap 102. For example, as illustrated in FIG. 1B, packet 118a and packet 118b can be part of a packet traffic flow 120 between switch/router 104a and switch/router 104b. Packet 118a can flow from switch/router 104a to switch/router 104b and packet 118b can flow in the opposite direction from switch/router 104b to switch/router 104a. Because packets 118a and 118b are part of the same packet traffic flow 120, portions of the packets 118a and 118b can include the same common header data along with the payload, even if the packets 118a and 118b have different packet structures (e.g., different tunneling encapsulation headers). The common header data of these packets can be the same or symmetric (swapped) source and destination identifiers. This could include, but is not limited to: source and destination MAC identifiers, source and destination IP identifiers, source and destination UDP port identifiers, etc., fragments of source and destination MAC identifiers, source and destination IP identifiers, source and destination UDP port identifiers, etc. (e.g., the first octet of the IP address), etc. Common data could also include other common values within packets of a same packet traffic flow and/or traffic class, TTL, packet payload data, specifically set flag or flags, or some other data that is common to a specific group of packets that may or may not be part of the same traffic flow.

Also, packet 122a and packet 122b can be part of a packet traffic flow 124 between switch/router 104c and switch/router 104d. Packet 122a can flow from switch/router 104c to switch/router 104d, and packet 122b can flow in the opposite direction from switch/router 104d to switch/router 104c. Because packets 122a and 122b are part of the same packet traffic flow 124, portions of the packets 122a and 122b can include the same common data. Packet 126 can also flow from switch/router 104c to switch/router 104d. Because the packet 126 is not part of the packet traffic flow

120 or the packet traffic flow 124, the packet 126 does not include the same common data in packets 118a and 118b, and also does not include the same common data in packets 122a and 122b.

After packets in packet traffic flows are intercepted by the network tap 102, the packet data extraction engine 112 in the load balance hash engine 110 can extract data from the packets in the packet traffic flow. A network tap (also called an aggregation switch, a tap aggregator, or a tap box) can aggregate and monitor traffic from multiple devices in a given network. With a network tap, packets in the network traffic are copied and the copy is sent to one or more monitor appliances (e.g., analyzers) for analysis.

In one example case, network devices 22, 24 (FIG. 1A) can be used to make copies of packets, and subsequently send those packets to the aggregation switch 28, which can then perform the hashing operations on the copies it received. The aggregation switch 28 can then send those out of the appropriate port channel to each of the members connected to a particular collector, as described herein. In other example cases, the aggregation switch 28 is not involved in these activities, and it is the actual network devices 22, 24 that are making the forwarding decisions and performing hashing operations depending on the contents of the packet. Hence, the network devices 22, 24 can operate independently in certain example scenarios, without involving an aggregation switch 28. Such activities can be performed on traffic for associated network members (e.g., equal-cost multipath (ECMP) members). In this way, the network devices 22, 24 are able to achieve the same hashing result for the packets having different header statistics but with the same relevant fields, for example, inner headers, or for packets having common payload data. Consider a scenario in which a given network device 22, 24 receives MPLS traffic and non-MPLS traffic from a bidirectional traffic flow of packets, where a hash of the packets is performed to determine where to direct the packets. Network devices 22, 24 can use any common data within the incoming packets to perform the hash and, subsequently, send packets yielding a common hash to a particular group member in the network. Hence, network devices 22, 24 can receive different packet types and both types can be suitably hashed to the same port channel member. It is imperative to note that the broad term 'send' (and any permutations thereof) is meant to encompass any type of forwarding, switching, or otherwise communicating data from one point in the network to another. Additionally, as used herein, this broad term 'send' can encompass ancillary activities associated with making a copy of a packet, or a portion of a packet, for subsequent forwarding, hashing, or any other appropriate processing, which may be based on particular networking needs.

In operation of another example scenario, the tap can first identify the packets for a particular flow of interest, and those packets are duplicated (i.e., copied) for sending on to the analyzers. The original packets are sent on to continue on their way to their intended destinations. More specifically, the packet data extraction engine 112 can extract the common data from the packets 118a and 118b. The common data extracted from the packets 118a and 118b can be used by the key generation engine 114 to generate one or more keys. The one or more keys can be used by the packet hash engine 116 to create a hash for each of the packets 118a and 118b. Because the common data is the same or symmetric for each of the packets 118a and 118b, the hash can be the same. The hash can then be used to send copies of the packets 118a and 118b to one or more analyzers provisioned in the network.

For example, as illustrated in FIG. 1B, the packets 118a and 118b are sent to the analyzer 132a.

In addition, the packet data extraction engine 112 can extract the common data from the packets 122a and 122b. The common data extracted from the packets 122a and 122b can be used by the key generation engine 114 to generate one or more keys. The one or more keys can be used by the packet hash engine 116 to create a hash for each of the packets 122a and 122b. As described in the flow above, because the common data is the same or symmetric for each of the packets 122a and 122b, the hash can be the same. The hash can then be used to send copies of the packets 122a and 122b to an appropriate destination, in this scenario, the packets are sent to the analyzer 132b. Because packet 126 is not part of the packet traffic flow 120, or part of the packet traffic flow 124, this particular packet 126 does not include the common data of the packets 118a and 118b or the common data of the packets 122a and 122b. As a result, a copy of this particular packet 126 is not necessarily sent to the same destination as the packets in traffic flow 124 (e.g., not sent at all or sent to a different analyzer, in this instance, analyzer 132c).

Figure 2:
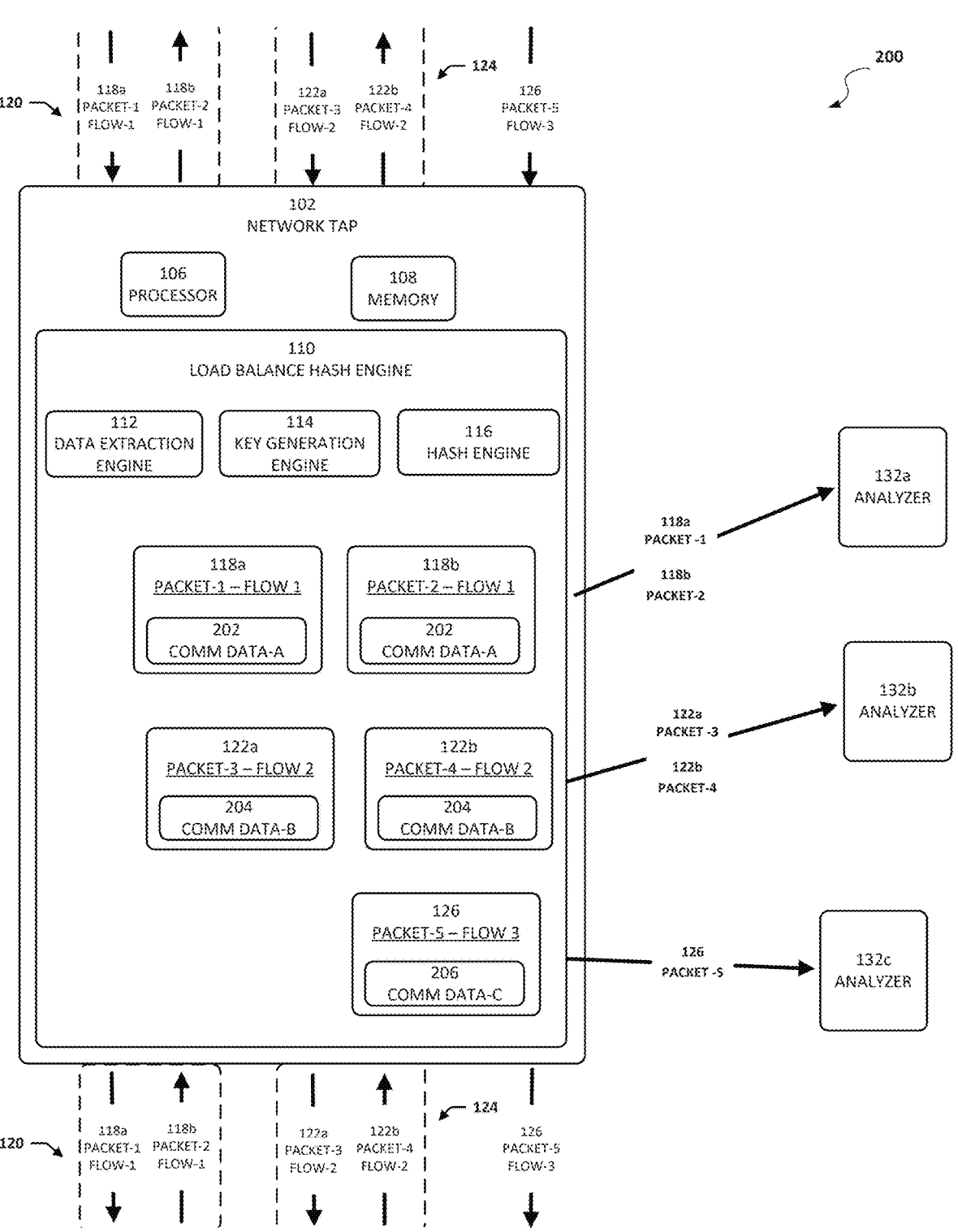
FIG. 2 is a simplified block diagram of a particular implementation using common packet data for enabling hash creation using arbitrary header field combinations, in accordance with an embodiment of the present disclosure.

Before turning to FIG. 2, along with other flow diagrams that illustrate many of the capabilities of the present disclosure, it is important to understand some of the current challenges for network operators and system designers seeking to effectively monitor, route, and otherwise manage packet traffic. When monitoring a particular flow, the route between the hosts (e.g., the source and destination of a packet) may transit various network tunnels. When traffic is tapped from multiple devices in the network, from within and without various tunnels, a given network tap can receive packets from the same flow, but those packets may have different network header stacks. For example, packets from the same packet traffic flow may be encapsulated with headers from various different networking protocols, (e.g., generic routing encapsulation (GRE), multiprotocol label switching (MPLS), virtual extensible local area network (VXLAN), etc.). This means that such packets in the same packet traffic flow would have different network header stacks.

In a specific example, a packet traveling one direction in a bidirectional packet traffic flow may not have an MPLS header, while a packet traveling in the reverse/opposite direction in the bidirectional packet traffic flow may have an MPLS header. The different network header stacks can make it difficult to aggregate packets from the same bidirectional flow out the same port channel and to a specific analyzer, irrespective of the presence of tunnel encapsulation headers. A port channel aggregates multiple physical interfaces or physical links into one logical interface or channel group to create a single logical interface or link that provides higher bandwidth, load balancing, and link redundancy. An analyzer can be associated with a port channel. Hashing can be used to determine which member interface of the port channel is used to transmit the packet, and the packet is sent to the analyzer on the physical link associated with the port channel.

Conventional packet hashing approaches on switch hardware cannot aggregate packets from the same bidirectional flow and then switch packets out of the same port channel if the header structure of the packets traveling in opposite directions is different because the packet header structure itself is used as input for the hash functions that select a port channel member link. For example, in terms of encapsulated packets and non-encapsulated packets, MPLS packets and non-MPLS packets result in different hashes, even though the MPLS fields are not used for the hash algorithm. More specifically, the data used to generate the keys that will be used in the hash for the MPLS packets are offset by the zeros corresponding to the MPLS (or extra) header. Ideally, both MPLS packets and non-MPLS packets with the same IP addresses should generate the same hash such that MPLS packets and non-MPLS packets from the same packet traffic flow can be sent to the same analyzer or monitoring appliance. Hence, what is needed is a system, an apparatus, and a method to enable packet load balancing using arbitrary header field combinations and, further, that allow packets within the same packet traffic flow or copies of packets to be sent to the same destination, such as an analyzer, even when the packets have different packet structures.

A system, a method, an apparatus, and a means are provided to enable packet load balancing or packet aggregation using arbitrary header field combinations to help resolve these issues (and others). In an example, a system and method can allow for packet aggregation using arbitrary header field combinations so that packets in the same packet traffic flow can generate the same hash and can be sent to the same analyzer or monitoring appliance. More specifically, the system and method can allow both MPLS packets and non-MPLS packets from the same packet traffic flow to generate the same hash and, therefore, be sent to the same analyzer or monitoring appliance. Note that MPLS packets and non-MPLS packets are just example packets for purposes of teaching and discussion, and the architecture described herein is not limited to only MPLS packets and non-MPLS packets. In addition, while the system and method are described as being used for tap aggregation mode, it may also be applicable to a switching mode. For example, the architecture of the present disclosure can effectively route packets through a network based on distinct packet hashes created by the system, as detailed below.

In a typical configuration, due to hardware designs, network load balance hashes are based on the packet header structure, as well as specific fields in the packet. When a hash for packets from the same packet traffic flow (but with different network header structures) are generated by a network tap, due to the different network header structures for each direction of the traffic flow, the packets can generate a different hash, even though they are from the same packet traffic flow. To overcome this issue, the system can ignore the packet header structure and, instead, allow for creating the hash for each packet using arbitrary bits of the packet from user-defined fields configurable per packet type.

In a specific example, one or more keys (e.g., two 160-bit keys) are constructed from user-defined fields [configurable per packet type], and are then used as input for the hashing functions that select an outgoing port channel that forwards packets. The contents of the keys are user configurable and contain either fields extracted from bytes of the packet headers (e.g., the first 144 bytes of the packet header) and/or internal packet variables (e.g., packet length, payload, trailer, etc.). Generating and using these keys as input for the packet hashing is configurable per packet type, allowing a user to define some common hashing criteria for a particular set of packet types (e.g., use only the source and destination IP addresses as input for the packet hash on both IPv4 and MPLS over IPv4 packets). This solves the problem of packets in the same packet traffic flow generating two different hashes by allowing the system to ignore the header position of the IP header in the packet and symmetrically hash on only the IP port fields and layer four (L4) port fields. Symmetric hashing is accounted for, so packets traveling in opposite directions of the traffic flow with the DIP and SIP values swapped can have the same hash.

In the network tap, the output of the hashing function normally depends on the tunneling structure of the packets, in addition to their contents. By using an alternative hash input and by discarding the conventional input, the system is able to ignore the structure of the packet when constructing a hash for the packet. The network tap is configured to replace the conventional hashing keys generated by the parser with new hashing keys generated using the user-defined fields. The user-defined fields provide greater flexibility in defining the exact contents of the hashing keys per packet type. This provides the user with much more precise control over the inputs to the packet hashing, allowing them to define common hashing criteria for a configurable set of packet types.

Turning to FIG. 2, FIG. 2 is a simplified block diagram of a particular non-limiting implementation of the system 200 illustrating the use of common packet data for enabling hash creation using arbitrary header field combinations. The system 200 can include the network tap 102 and the switches/routers 104a-104d, as discussed above with reference to FIG. 1. Each of these devices can have internal structures and functionalities similar to those described above. In operation, packets in a traffic flow between two or more switches, routers, and/or hubs can be intercepted by the network tap 102. As illustrated, packets 118a and 118b are part of the same packet traffic flow 120 such that they include the same common data 202. The common data 202 can be the same or symmetric source and destination identifiers, or other common values within packets of a same packet traffic flow, as discussed above.

Packet 122a and packet 122b can be part of a packet traffic flow 124 (e.g., between switch/router 104c and switch/router 104d), as illustrated in FIG. 2. Packets 122a and 122b can include the same common data 204, similar to the case for the flow associated with common data 202. Packet 126 can also flow from switch/router 104c to switch/router 104d and include header data 206. Because the packet 126 is not part of the packet traffic flow 120, the packet 126 does not include the same common data 202 in packets 118a and 118b, and also does not include the same common data 204 in packets 122a and 122b.

After packets in a packet traffic flow are intercepted by the network tap 102, the packet data extraction engine 112 extracts header data from the packets in the packet traffic flow (e.g., extract the common data 202 from the packets 118a and 118b). The common data 202 extracted from the packets 118a and 118b can be used by the key generation engine 114 to generate one or more keys for creating a hash for each of the packets 118a and 118b. Because the common data 202 is the same or symmetric for each of the packets 118a and 118b, the hash can be the same. The hash can then be used for sending the packets 118a and 118b from the same port channel to an appropriate analyzer (e.g., the packets 118a and 118b can be sent to the analyzer 132a, as is illustrated).

Similarly, the packet data extraction engine 112 can extract the common data 204 from the packets 122a and 122b for use by the key generation engine 114 to generate one or more keys. The keys can be used by the packet hash engine 116 to create a hash for each of the packets 122a and 122b. The common data 204 is the same (or symmetric with respect to source and destination data) for each of the packets 122a and 122b, which results in the hash being the same. The hash is used to send the packets 122a and 122b to the analyzer 132b. Continuing with this example, the packet data extraction engine 112 can extract the common data 206 from the packet 126. The common header data 206 is used by the key generation engine 114 to generate one or more keys. The keys are used by the packet hash engine 116 to create a hash for packet 126. The hash is then used to send a copy of the packet 126 to the analyzer 132c.

In operation of a particular use case applicable to an access control list (ACL) block (which acts as a filter by applying a list of rules to packets to determine whether to provide or deny access to network resources) on a switching application specific integrated circuit (ASIC), two keys (e.g., 160 bits in length) can be constructed for use as input for the hashing functions that select an outgoing port-channel member link. The contents of the keys are user configurable and contain either fields extracted from the initial bytes (e.g., 144B) of the packet headers and/or internal variables generated by the ASIC about the packet. Generating and using these keys as input for the packet hashing is configurable per packet type, allowing a network operator to define common hashing criteria for a particular set of packet types. Hence, in one general sense, the architecture can use the switching ASIC's capability to replace the load balance hashing keys computed by a parser with new ones, which are generated later in the pipeline by the ACL block. In this way, the ACL block can provide great flexibility in defining the exact contents of these keys, per packet type, as identified by the parser. This further provides the user with much more precise control over the inputs to the packet hashing, allowing them to define common hashing criteria for a configurable set of packet types.

Figure 3:
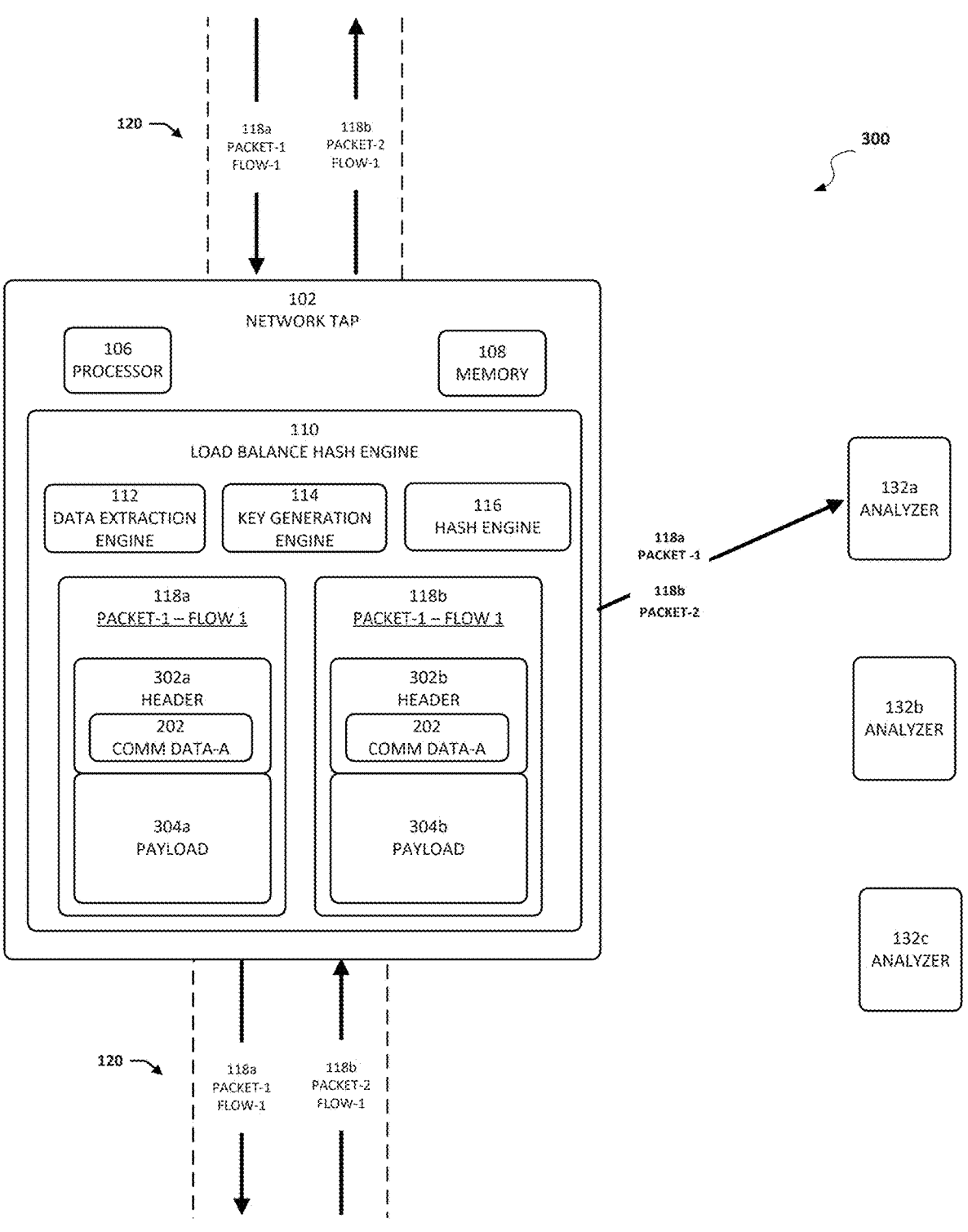
FIG. 3 is a simplified block diagram of a particular implementation using common packet data in a header of a packet for enabling hash creation using arbitrary header field combinations, in accordance with an embodiment of the present disclosure.

Turning to FIG. 3, FIG. 3 is a simplified block diagram of a particular non-limiting implementation of a system 300 using common packet data in a header of a packet for enabling hash creation using arbitrary header field combinations. The system 300 can include architecture and components similar to that of FIGS. 1 and 2 and, therefore, can provide similar functionalities, as discussed above.

In operation for a particular illustrative example, packets in packet traffic flows from two or more switches, routers, and/or hubs are intercepted by the network tap 102. Packets 118a and 118b can include a header portion and a payload portion. For example, packet 118a includes header 302a and payload 304a, and packet 118b includes header 302b and payload 304b. The header 302a in packet 118a can be different from the header 302b in packet 118b. More specifically, packet 118a may be a non-MPLS packet and header 302a may be an IP packet header, while packet 118b may be an MPLS packet and header 302b may be an MPLS packet header. Because packets 118a and 118b are part of the same packet traffic flow 120, packets 118a and 118b can include the same or symmetric header data 202, where the header data 202 is located in the corresponding header portion of the packets.

Figure 4:
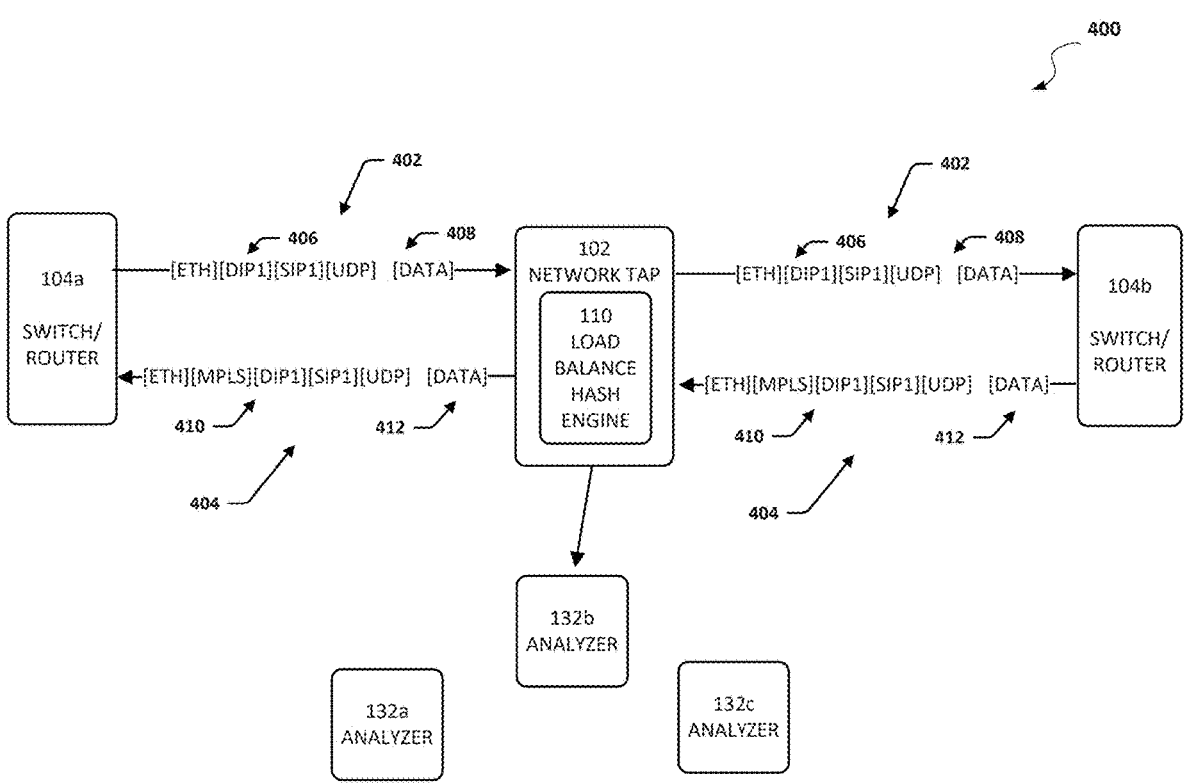
FIG. 4 is a simplified block diagram of a portion of a system for enabling hash creation using arbitrary header field combinations, in accordance with an embodiment of the present disclosure.

Turning to FIG. 4, FIG. 4 is a simplified block diagram of a particular non-limiting implementation of the system 400 for enabling hash creation using arbitrary header field combinations. The system 400 can include the architecture associated with the network tap 102 and the switches/routers 104a and 104b of the previous FIGURES and, therefore, have similar functionalities, as those described above. A first packet 402 can be sent from the switch/router 104a to the switch/router 104b and a second packet 404 can be sent from the switch/router 104b to the switch/router 104a. The first packet 402 and the second packet 404 are part of the same packet traffic flow. The first packet can include a first packet header 406 and a first packet payload 408. The second packet 404 can include a second packet header 410 and a second packet payload 412.

As illustrated in FIG. 4, the first packet header 406 is different from the second packet header 410. More specifically, the first packet header 406 includes an ethernet header portion, a destination IP portion, a source IP portion, and a UDP portion while the second packet header 410 includes the ethernet header portion, an MPLS header portion, the destination IP portion, the source IP portion, and the UDP portion. The destination IP and source IP are swapped in header 410, compared to header 406. In conventional network taps, using the first packet 402 would generate a first hash and using the second packet would generate a second different hash because the first packet header 406 is different, as compared to the second packet header 410. More specifically, because of the MPLS header in the second packet header 410, (or an extra header in the second packet header 410), the data used to generate the keys that will be used in the hash for the second packet 404 are offset by the zeros corresponding to the MPLS (or extra) header. The offset is what causes a different key to be generated and a different hash for each of the first packet 402 and the second packet 404, even though the first packet 402 and the second packet 404 are part of the same flow.

The load balance hash engine 110 can be configured to generate the same hash for packets in the same packet traffic flow, independent of the direction of the packets in the flow, allowing the packets to be sent to the same analyzer or monitoring appliance. For example, the system and method can allow both MPLS packets and non-MPLS packets within the same packet traffic flow to generate the same hash and, therefore be sent to the same analyzer or monitoring appliance. More specifically, the first packet 402 and the second packet 404 share common data (e.g., the common data 202) such that a hash including one or more of the ethernet header portion, the destination IP portion, the source IP portion, and the UDP portion in the first packet header 406 and the second packet header 410 result in the same hash. This allows copies of the first packet 402 and the second packet 404 to be sent to the same member interface of the port channel used to transmit the packets, and thus to the same analyzer 132b associated with that member interface, versus being sent to any of the other analyzers 132a or 132c, which are associated with other member interfaces of the port channel.

Figure 5:
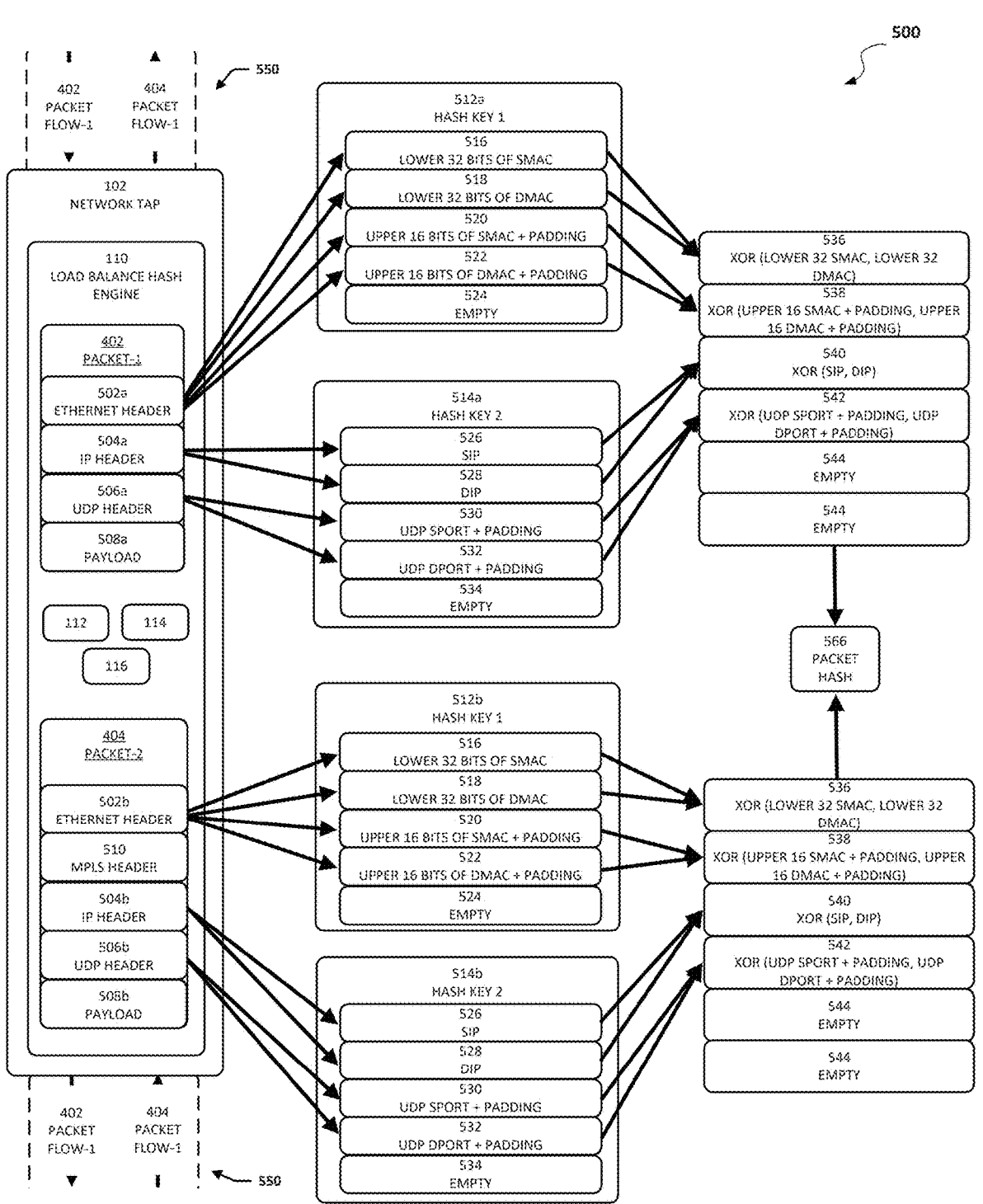
FIG. 5 is a simplified block diagram of a particular implementation using symmetric hashing of keys, in accordance with an embodiment of the present disclosure.

Turning to FIG. 5, FIG. 5 is a simplified block diagram of a particular non-limiting implementation of a system 500 using symmetric hashing keys for enabling hash creation using arbitrary header field combinations. The system 500 can include the network tap 102 and the load balance hash engine 110, both of which can perform functionality similar to that described above with reference to the preceding FIGURES.

In an example that continues with the preceding example of FIG. 4, the network tap 102 can receive the first packet 402 and the second packet 404. The first packet 402 and the second packet 404 can be part of the same packet traffic flow 550, as indicated, flowing in different directions. However, the first packet 402 and the second packet 404 do not have the same packet structure. More specifically, as illustrated in the case of FIG. 5, the first packet 402 can be a non-MPLS packet and include an Ethernet header 502a, an IP header 504a, a UDP header 506a, and a payload 508a, while the second packet 404 can be an MPLS packet and include an Ethernet header 502b, an MPLS header 510, an IP header 504b, a UDP header 506b, and a payload 508b. Because the first packet 402 and the second packet 404 are part of the same packet traffic flow 550, the Ethernet header 502*a*, the IP header 504*a*, and the UDP header 506*a* in the first packet 402 and the Ethernet header 502*b*, the IP header 504*b*, and the UDP header 506*b* in the second packet 404 are common data (e.g., the common data 202) shared between the first packet 402 and the second packet 404.

In this instance, the packet data extraction engine 112 is configured to extract the common data from the first packet 402 and the second packet 404, where the common data is used by the key generation engine 114 to generate keys, which are subsequently used by the packet hash engine 116 to create a hash. The hash is the same because the header data is the same or symmetrical with respect to source and destination. The hash is then used to send copies of the packets from the same member interface of the port channel to an appropriate analyzer, as discussed above.

In the specific example illustrated in FIG. 5, keys are constructed from user-defined fields configurable per packet type, which are then used as input for the hashing functions that select an outgoing port channel member interface of network tap 102 to send copies of the packets to an analyzer. The contents of the keys are user configurable and they contain either fields extracted from bytes of the packet headers and/or internal packet variables. For example, a first hash key 512*a* and a second hash key 514*a* can be created using the common data in the first packet 402, and a first hash key 512*b* and a second hash key 514*b* can be created using the common data in the second packet 404. In alternative examples, a single hash key can use the common data of packets (in the same packet flow or related packets) to create the same packet hash for each packet. Because the first packet 402 and the second packet 404 are part of the same packet traffic flow, the first hash key 512*a* and the second hash key 514*a* can be used to generate a packet hash 566 for the first packet 402, and the first hash key 512*b* and the second hash key 514*b* can be used to generated the same packet hash 566 for the second packet 404.

In a specific non-limiting example, the first hash key 512*a* for the first packet 402 can include the lower 32 bits of the source MAC address 516, the lower 32 bits of the destination MAC address 518, the upper 16 bits of the source MAC address plus padding 520, and the upper 16 bits of the destination MAC address plus padding 522 from the Ethernet header 502*a* in the first packet 402. In some examples, the first hash key 512*a* can include one or more empty fields 524 (also termed 'placeholder fields'). The one or more empty fields 524 can be used for non-symmetric data for the hash (e.g., traffic class, TTL, packet payload data, specifically set flag or flags, etc.). Similarly, the first hash key 512*b* for the second packet 404 can include the lower 32 bits of the source MAC address 516, the lower 32 bits of the destination MAC address 518, the upper 16 bits of the source MAC address plus padding 520, and the upper 16 bits of the destination MAC address plus padding 522 from the Ethernet header 502*b* in the second packet 404. In some examples, the first hash key 512*b* can include the one or more empty fields 524. The second hash key for a packet (e.g., the second hash key 514*a* for the first packet 402, as illustrated in FIG. 5) can include the source IP address 526, the destination IP address 528 from the IP header in the packet and the UDP source port plus padding 530 and UDP destination port plus padding 532 from the UDP header in the packet. In some examples, the second hash key can include the one or more empty fields 534.

In addition, the second hash key 514*a* for the first packet 402 can include the source IP address 526, the destination IP address 528 from the IP header 504*a* in the first packet 402 and the UDP source port plus padding 530 and the UDP destination port plus padding 532 from the UDP header 506*a* in the first packet 402. In some examples, the second hash key 514*a* can include one or more empty fields 534 or placeholder fields. Similarly, the second hash key 514*b* for the second packet 404 can include the source IP address 526, the destination IP address 528 from the IP header 504*b* in the second packet 404 and the UDP source port plus padding 530 and the UDP destination port plus padding 532 from the UDP header 506*b* in the second packet 404. In some examples, the second hash key 514*b* can include the one or more empty fields 534 for non-symmetric data or other data that may be used when creating a hash for a packet. In certain example implementations, this extra space could be used to use non-symmetric data for the hash such as TTL, traffic class, etc.

Generating and using the first hash key and the second hash key as input for the packet hashing is configurable per packet type, allowing a user to define common hashing criteria for a particular set of packet types (e.g., use only the source and destination IP addresses as input for the packet hash on both IPv4 and MPLS over IPv4 packets). This solves the problem of packets in the same packet traffic flow incorrectly generating two different hashes by allowing the system to ignore the header position of the IP header in the packet and, further, to symmetrically hash on the IP and L4 port fields. Symmetric hashing is accounted for, so packets with the source identifier and destination identifier that are swapped can continue to have the same hash.

In a packet traffic flow, the source MAC address, destination MAC address, source IP, destination IP, source UDP port, and destination UDP port for packets traveling in a first direction (e.g., upstream direction) are reversed compared to packets traveling in a second opposite direction (e.g., downstream direction). Because the source MAC address, destination MAC address, source IP, destination IP, source UDP port, and destination UDP port are switched, an XOR operation can be applied to allow for the symmetric hashing. In an XOR operation, the order of the inputs does not matter so even if the source MAC address, destination MAC address, source IP, destination IP, source UDP port, and destination UDP port are switched, the results are still the same.

More specifically, a lower MAC XOR operation 536 can be performed using data from the lower 32 bits of the source MAC address 516 and the lower 32 bits of the destination MAC address 518 in the Ethernet header of the packet. In addition, an upper MAC XOR operation 538 can be performed using data from the upper 16 bits of the source MAC address plus padding 520 and the upper 16 bits of the destination MAC address plus padding 522 in the Ethernet header of the packet. In addition, an IP XOR operation 540 can be performed using data from the source IP address 526 and the destination IP address 528 from the IP header in the packet. Further, a UDP XOR operation 542 can be performed using the UDP source port plus padding 530 and the UDP destination port plus padding 532 from the UDP header in the packet. In some examples, one or more empty fields 544 remain empty, or can include data from the one or more (empty) fields 524 in the first hash key and the one or more empty fields 534 in the second hash key. The results of the lower MAC XOR operation 536, the upper MAC XOR operation 538, the IP XOR operation 540, and the UDP XOR operation 542 can be used to create the packet hash 566. Due to the nature of the XOR operation, the packet hash 566 can be the same for packets in both directions of the same packet traffic flow (the same for both upstream packets and for downstream packets).

Figure 6:
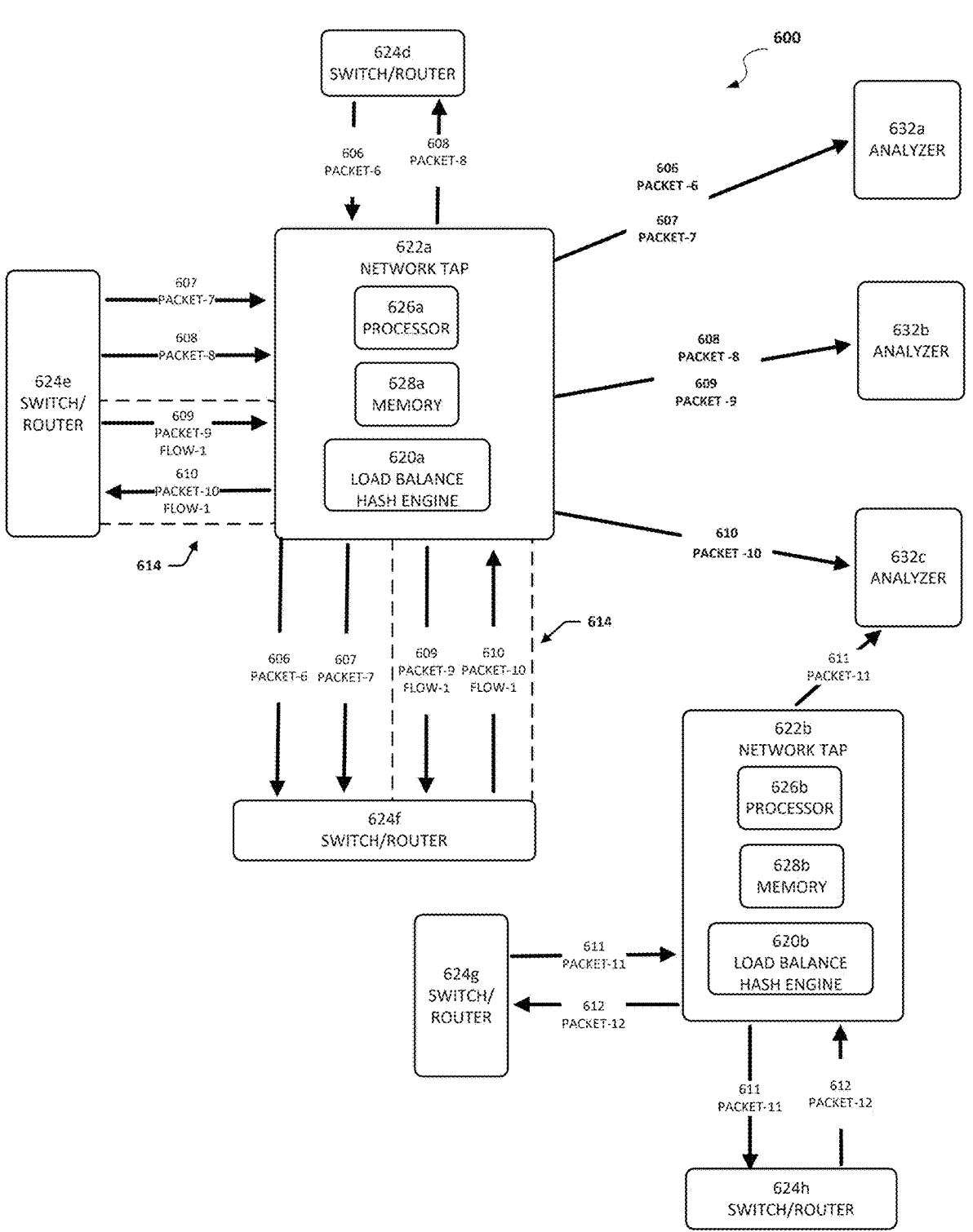
FIG. 6 is a simplified block diagram of a particular implementation for key hashing to enable hash creation using arbitrary packet field combinations, in accordance with an embodiment of the present disclosure.

Turning to FIG. 6, FIG. 6 is a simplified block diagram of a particular non-limiting implementation of a system 600 using hashing keys for enabling hash creation using arbitrary packet field combinations. This particular architecture of system 600 includes functionalities similar to that of system 100 of FIG. 1B, but with additional capabilities and variations, as detailed below. In addition to some of the architectural aspects previously discussed, the system 600 can include a first network tap 622a and a second network tap 622b. The first network tap 622a can include one or more processors 626a, memory 628a, and a load balance hash engine 620a. The second network tap 622b can include one or more processors 626b, memory 628b, and a load balance hash engine 620b. System 600 can also include a number of switch/routers 624d-h.

In an example, the first network tap 622a can receive packets (generally indicated by arrows 606-610) from a switch/router 624d, a switch/router 624e, and a switch/router 624f. Certain packets can include the same common data. For example, the packets can have the same TTL (or be the same traffic class, include the same packet payload data, each have the same specifically set flag or flags, or some other data that is common to the packets). Note that the packets are not necessarily part of the same traffic flow in this example. The load balance hash engine 620a can extract the common data from the packets and use the common data to create a hash for the packets. Because the same data was used to create the hash, the packets can have the same hash, and they will be sent to an appropriate analyzer 632a-c.

Also, the first network tap 622a can receive a packet 606, a packet 607, a packet 608, a packet 609, and a packet 610. Some of these packets can include the same common data (e.g., the same traffic class, have the same TTL, include the same packet payload data, each have the same specifically set flag or flags, or some other data common to the packets). In this example, the packet 608 is not part of the same traffic flow 614 that includes the packet 609. However, the load balance hash engine 620a extracts the common data from the packets, and uses the common data to create a hash for the packets. Because the same data was used to create the hash, the packets 608 and 609 can have the same hash, and they will be sent to the analyzer 632b, as is illustrated. Note that packets from two or more packet streams can be sent to the same analyzer. For example, the packets 608 and 609 are from different packet streams (the packets are from the same traffic flow 614 but are from different packet streams, one upstream and one downstream) and the packets are sent to the analyzer 632b.

Also, different network taps can each send packets that have the same common data to the same analyzer. For example, the load balance hash engine 620a in the first network tap 622a can extract the common data from the packet 610, use the common data to create a hash for the packet, and send the packet to the analyzer 632c, while the load balance hash engine 620b in the second network tap 622b can extract the common data from the packet 611, use the common data to create a hash for the packet, and send the packet 611 to the analyzer 632c. Note that in other example scenarios, copies of packet 610 can be generated and sent to more than one analyzer. In some examples, a network tap does not send a packet to an analyzer. For example, the network tap can receive the packet 612 from the switch/router 624h and, based on implemented network policy, elect not to send the packet to any analyzer.

Turning to FIG. 7, FIG. 7 illustrates an example flowchart illustrating operations of a flow 700 that may be associated with a system, an apparatus, and a method to help create a hash for a packet and enable packet load balancing using arbitrary header field combinations. In some examples, one or more operations of flow 700 may be performed by the load balance hash engine 110, the packet data extraction engine 112, the key generation engine 114, and/or the packet hash engine 116, as described above. At 702, a first packet traveling in a first direction in a packet traffic flow is received at a network tap. For example, a given packet can flow from a switch/router to another switch/router and be intercepted by the network tap. At 704, a hash for the first packet is created using user-defined inputs to one or more hash keys. For example, a user can define the lower 32 bits of the source MAC address, the lower 32 bits of the destination MAC address, the upper 16 bits of the source MAC address plus padding, and the upper 16 bits of the destination MAC address plus padding from the Ethernet header in the packet as inputs to the first hash key and the source IP address, the destination IP address from the IP header in the packet and the UDP source port plus padding and the UDP destination port plus padding from the UDP header in the packet as inputs to the second hash key.

At 706, a second packet traveling in a second opposite direction in the packet traffic flow is received at the network tap, where the second packet has a different structure from the first packet. For example, the packet can flow from a given switch/router to another switch/router (the opposite direction of the packet traffic flow of packet) and can be intercepted by the network tap. The protocols can be different, where the first packet can be a non-MPLS packet and the second can be an MPLS packet with a different header structure from the first packet. More generally, the present system can include any number of encapsulation headers from various protocols (e.g., involving IPv4, IPv6, general routing encapsulation (GRE), etc.). At 708, the same hash created for the first packet is created for the second packet using the user defined inputs. For example, the user defined inputs to the first hash key can include the lower 32 bits of the source MAC address, the lower 32 bits of the destination MAC address, the upper 16 bits of the source MAC address plus padding 20, and the upper 16 bits of the destination MAC address plus padding from the Ethernet header in the packet and the user defined inputs to the second hash key include the source IP address, the destination IP address from the IP header in the packet and the UDP source port plus padding and the UDP destination port plus padding from the UDP header in the packet. Because the packets can be part of the same packet traffic flow and the XOR operation, the hash for the second MPLS packet can be the same as the hash for the non-MPLS packet.

Figure 8:
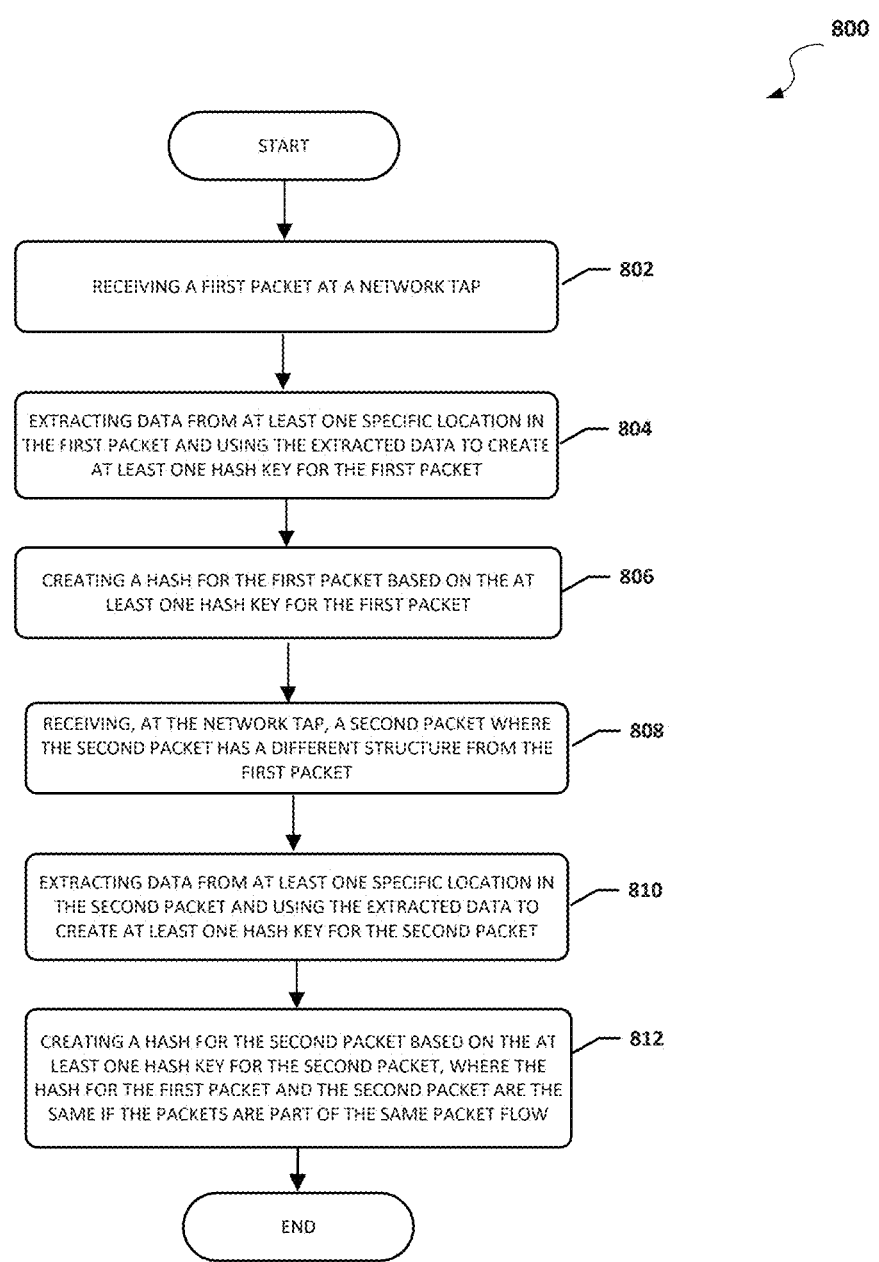
FIG. 8 is a simplified flowchart illustrating potential operations that may be associated with configuring a system to extract data for one or more hash keys for enabling hash creation using arbitrary header field combinations in accordance with an embodiment of the present disclosure.

Turning to FIG. 8, FIG. 8 illustrates an example flowchart illustrating operations for a flow 800 that may be associated with creating a hash for a packet using arbitrary header field combinations. In this example, one or more operations are performed by the load balance hash engine, the packet data extraction engine, the key generation engine, and/or the packet hash engine. At 802, a first packet is received at any given network tap. For example, a packet would flow from a switch/router to another switch/router, and be intercepted by the network tap. At 804, data from at least one specific location in the first packet is extracted from the first packet, and the extracted data is used to create at least one hash key for the first packet. In one example, data in the first packet can be extracted from the lower 32 bits of the source MAC address, the lower 32 bits of the destination MAC address, the upper 16 bits of the source MAC address plus padding, and the upper 16 bits of the destination MAC address plus padding from the Ethernet header in the first packet and the data can be used as inputs to the first hash key. In addition, data in the first packet can be extracted from the source IP address, the destination IP address from the IP header in the packet and the UDP source port plus padding and the UDP destination port plus padding from the UDP header in the first packet and the data can be used as inputs to a second hash key. At 806, a hash for the first packet is created based on at least one hash key for the first packet. For example, the packet hash can be created for the first packet based on the first hash key and on the second hash key.

At 808, a second packet is received at the network tap, where the second packet has a different structure from the first packet. For example, packets can flow from switch/router to switch/router (the opposite direction of the packet traffic flow of packet) and can be intercepted by the network tap. The first packet can be a non-MPLS packet and the second packet can be an MPLS packet with a different structure from the first packet. (Other encapsulation headers can again include IPv4, IPv6, GRE, etc.) At 810, data from at least one specific location in the second packet is extracted from the second packet and the extracted data is used to create at least one hash key for the second packet. For example, data in the second packet can be extracted from the lower 32 bits of the source MAC address, the lower 32 bits of the destination MAC address, the upper 16 bits of the source MAC address plus padding, and the upper 16 bits of the destination MAC address plus padding from the Ethernet header in the second packet and the data can be used as inputs to the first hash key. In addition, data in the second packet can be extracted from the source IP address, the destination IP address from the IP header in the packet and the UDP source port plus padding and the UDP destination port plus padding from the UDP header in the second packet and the data can be used as inputs to the second hash key. At 806, a hash for the second packet is created based on at least one hash key for the second packet, where the hash for the first packet and the second packet are the same if the packets are part of the same packet traffic flow. For example, the packet hash can be created for the second packet based on the first hash key and on the second hash key. If the packets are part of the same packet traffic flow, using the XOR operation, the user defined inputs to the first hash key, and the user defined inputs to the second hash key (e.g., the source IP address, the destination IP address and the UDP source port plus padding and the UDP destination port plus padding) the hash for the first packet can be the same as the hash for the second packet if the packets are part of the same packet traffic flow.

Turning to FIG. 9, FIG. 9 illustrates an example flowchart illustrating possible operations of a flow 900 that may be associated with creating a hash for any kind of encapsulation, non-encapsulation, or for multiple concurrent encapsulations. In this particular instance, FIG. 9 specifically offers an example for creating a hash for a non-MPLS packet and the same hash for an MPLS packet. At 902, a non-MPLS packet from a packet traffic flow is received at a network tap. The packet can be a non-MPLS packet part of the packet traffic flow and the non-MPLS packet can be intercepted by the network tap. At 904, data from the non-MPLS packet is extracted from user-defined fields to create at least one hash key. For example, data in the non-MPLS packet can be extracted from the lower 32 bits of the source MAC address, the lower 32 bits of the destination MAC address, the upper 16 bits of the source MAC address plus padding, and the upper 16 bits of the destination MAC address plus padding from the Ethernet header in the non-MPLS packet and the data can be used as inputs to the first hash key. In addition, data in the non-MPLS packet can be extracted from the source IP address, the destination IP address from the IP header in the packet and the UDP source port plus padding and the UDP destination port plus padding from the UDP header in the non-MPLS packet and the data can be used as inputs to the second hash key. At 906, a hash for the non-MPLS packet is created based on at least one hash key. For example, the packet hash can be created for the non-MPLS packet based on the first hash key and on the second hash key.

At 908, an MPLS packet from the packet traffic flow is received at the network tap. For example, a packet can be an MPLS packet that is part of the same packet traffic flow as the non-MPLS packet, and intercepted by the network tap. The non-MPLS packet has a different packet structure as compared to the MPLS packet. At 910, data from the MPLS packet is extracted from the user-defined fields to create at least one hash key. For example, data in the MPLS packet can be extracted from the lower 32 bits of the source MAC address, the lower 32 bits of the destination MAC address, the upper 16 bits of the source MAC address plus padding, and the upper 16 bits of the destination MAC address plus padding from the Ethernet header in the MPLS packet and the data can be used as inputs to the first hash key.

In addition, data in the MPLS packet can be extracted from the source IP address, the destination IP address from the IP header in the MPLS packet and the UDP source port plus padding and the UDP destination port plus padding from the UDP header in the MPLS packet and the data can be used as inputs to the second hash key. At 912, the same hash as the hash for the non-MPLS packet is created for the MPLS packet based on at least one hash key. For example, the packet hash can be created for the MPLS packet based on the first hash key and on the second hash key.

Regarding a physical implementation of the network tap 102 and its associated components such as the load balance hash engine 110, the packet data extraction engine 112, the key generation engine 114, the packet hash engine 116, etc., these components may include any appropriate software, logic, source/object code, and/or hardware to achieve the hash creation capabilities detailed herein. To this end, any suitable permutation of these components may be configured and provisioned in an architecture based on particular needs and requirements, including the design of the particular network in which the network tap 102 is implemented. In one embodiment, the network tap 102 may be integrated with the load balance hash engine 110, the packet data extraction engine 112, the key generation engine 114, and/or the packet hash engine 116 (shown in the FIGURES), and share software and/or hardware resources (e.g., the processor 106 and the memory 108) to accomplish their hash creation objectives. Alternatively, the network tap 102 may be implemented separately from the load balance hash engine 110, the packet data extraction engine 112, the key generation engine 114, and/or the packet hash engine 116 with appropriate communication pathways to the network tap 102. In this alternative implementation, the network tap 102 may be provided with separate software and/or hardware resources including one or more processors and memory elements, or implemented as a proprietary device to be deployed to achieve any of the capabilities discussed herein.

Additionally, embodiments of the network tap 102, switches/routers 104a-104d, and analyzers 132a-132c may include one or more distinct interfaces, represented by any suitable network interfaces to facilitate communication via the various networks (including both internal and external networks) described herein. Such network interfaces may be inclusive of multiple wired and/or wireless interfaces (e.g., Wi-Fi, WiMax, 3G, 4G, 5G+, white space, 802.11x, satellite, Bluetooth, LTE, GSM/HSPA, CDMA/EVDO, DSRC, CAN, GPS, etc.). Other interfaces may include physical ports (e.g., Ethernet, USB, HDMI, etc.), interfaces for wired and wireless internal subsystems, and the like. Similarly, any of the components illustrated for system 100 can also include suitable interfaces for receiving, transmitting, and/or otherwise communicating data or information in a network environment.

The network tap 102 and other associated or integrated components can also be equipped with one or more suitable memory elements (e.g., memory 108) for storing information to be used in achieving operations associated with packet load balancing using arbitrary header field combinations, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 100 could be provided in any database, register, table, cache, queue, control list, or storage structure, based on particular needs and implementations, all of which could be referenced in any suitable time frame. Any of the memory or storage options discussed herein should be construed as being encompassed within the broad term 'memory element' as used herein in this Specification.

In example embodiments, the operations for enabling packet load balancing using arbitrary header field combinations, outlined herein, may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory 108) can store data used for the operations described herein. This includes the memory elements being able to store software, logic, code, or processor instructions that are executed to conduct the hashing activities described in this Specification.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the above detailed description, reference is made to the accompanying drawings that form a part hereof, where like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the system and method to enable packet load balancing using arbitrary header field combinations and its teachings are readily scalable and can accommodate a large number of components, as well as more complicated/sophisticated arrangements and configurations. Accordingly, the examples provided should not limit the scope or inhibit the broad teachings of the system and method to manage multiple precision time protocol domains and as potentially applied to a myriad of other architectures.

It is also important to note that the operations in the preceding flow diagrams (i.e., FIGS. 7-9) illustrate only some of the possible correlating scenarios and patterns that may be executed, some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the system and method have been illustrated with reference to particular elements and operations, these elements and operations may be replaced by any suitable architecture, protocols, and/or processes that achieve the intended functionality of the system and method.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   extracting first data from user-defined fields for a first packet having a first network header stack, and generating a first hash key from the extracted first data; and
   extracting second data from user-defined fields for a second packet having a second network header stack different from the first network header stack, and generating a second hash key from the extracted second data, such that the first hash key and the second hash key result in a same hash for both the first packet and the second packet independent of differences between the first and second network header stacks,
   wherein the first packet is directed along a first direction in a network and the second packet is directed along a second direction that is different from the first direction in the network, and
   further wherein the same hash is used to select an outgoing port channel member interface to be used in sending at least a portion of the first and the second packets in the network.

2. The method of claim 1, wherein content of the first and second hash keys is user-configurable and contains fields extracted from headers for the first and second packets.

3. The method of claim 1, wherein content of the first and second hash keys is user-configurable and contains fields extracted from internal variables generated by an application specific integrated circuit (ASIC) for the first and second packets.

4. The method of claim 1, wherein the generating of the first and second hash keys for hashing for the first and second packets is configurable per packet type.

5. The method of claim 1, wherein the generating of the first and second hash keys includes defining a hashing criteria for a particular set of packet types.

6. The method of claim 1, wherein the user-defined fields are user configurable and the user-defined fields include a source internet protocol (IP) address and a destination IP address.

7. The method of claim 1, wherein the first packet includes an encapsulated header, and the second packet includes a non-encapsulated header.

8. The method of claim 1, further comprising:
   performing packet load balancing using arbitrary header field combinations associated with a traffic flow for packets that include encapsulated headers and non-encapsulated packets to generate the same hash.

9. The method of claim 1, wherein the same hash is generated by symmetrically hashing on only selected IP port fields and layer four (L4) port fields.

10. The method of claim 1, wherein the sending of at least a portion of the first and the second packets in the network comprises making a copy of at least a portion of the first and second packets to send in the network.

11. The method of claim 1, wherein the sending of at least a portion of the first and the second packets in the network comprises forwarding at least a portion of the first and second packets in the network.

12. A network device, comprising:
   a key generation engine configured to:
      extracting first data from user-defined fields for a first packet having a first network header stack, and generating a first hash key from the extracted first data; and
      extracting second data from user-defined fields for a second packet having a second network header stack different from the first network header stack, and generating a second hash key from the extracted second data, such that the first hash key and the second hash key result in a same hash for both the first packet and the second packet independent of differences between the first and second network header stacks,
   wherein the first packet is directed along a first direction in a network and the second packet is directed along a second direction that is different from the first direction in the network, and
      further wherein the same hash is used to select an outgoing port channel member interface to be used in sending at least a portion of the first and the second packets in the network.

13. The network device of claim 12, wherein content of the first and second hash keys is user-configurable and contains fields extracted from headers for the first and second packets.

14. The network device of claim 12, wherein content of the first and second hash keys is user-configurable and contains fields extracted from internal variables generated by an application specific integrated circuit (ASIC) for the first and second packets.

15. The network device of claim 12, wherein the generating of the first and second hash keys for hashing for the first and second packets is configurable per packet type.

16. The network device of claim 12, wherein the generating of the first and second hash keys includes defining a hashing criteria for a particular set of packet types.

17. Computer-readable medium for hash creation in a network, the computer-readable medium containing instructions executable by a processor for:
   extracting first data from user-defined fields for a first packet having a first network header stack, and generating a first hash key from the extracted first data; and
   extracting second data from user-defined fields for a second packet having a second network header stack different from the first network header stack, and generating a second hash key from the extracted second data, such that the first hash key and the second hash key result in a same hash for both the first packet and the second packet independent of differences between the first and second network header stacks,
   wherein the first packet is directed along a first direction in the network and the second packet is directed along a second direction that is different from the first direction in the network; and further wherein the same hash is used to select an outgoing port channel member interface to be used in sending at least a portion of the first and the second packets in the network.

18. The computer-readable medium of claim 17, wherein the medium contains instructions executable by the processor for:

performing packet load balancing using arbitrary header field combinations associated with a traffic flow for packets that include encapsulated headers and non-encapsulated packets to generate the same hash.

19. The computer-readable medium of claim 17, wherein the first packet includes an encapsulated header, and the second packet includes a non-encapsulated header.

20. The computer-readable medium of claim 17, wherein the generating of the first and second hash keys includes defining a hashing criteria for a particular set of packet types.

* * * * *